(12) United States Patent
Wyman et al.

(10) Patent No.: US 11,935,570 B2
(45) Date of Patent: Mar. 19, 2024

(54) DATA TAPE QUALITY ANALYSIS

(71) Applicant: Oracle International Corporation, Redwood Shores, CA (US)

(72) Inventors: Robert Olin Wyman, Berthoud, CO (US); Frank Patrick Abbott, Jr., Brighton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/826,017

(22) Filed: May 26, 2022

(65) Prior Publication Data

US 2023/0005501 A1 Jan. 5, 2023

Related U.S. Application Data

(60) Provisional application No. 63/217,036, filed on Jun. 30, 2021, provisional application No. 63/217,040, filed on Jun. 30, 2021, provisional application No. 63/217,032, filed on Jun. 30, 2021.

(51) Int. Cl.
*G11B 5/55* (2006.01)
*G06F 18/214* (2023.01)

(52) U.S. Cl.
CPC .......... *G11B 5/5508* (2013.01); *G11B 5/5534* (2013.01); *G06F 18/214* (2023.01)

(58) Field of Classification Search
None
See application file for complete search history.

(56) References Cited

U.S. PATENT DOCUMENTS

| 4,101,937 A | * | 7/1978 | Jenkins | ..................... G11B 5/56 |
| | | | | 360/76 |
| 6,005,731 A | | 12/1999 | Foland et al. | |
| 7,864,482 B1 | | 1/2011 | Babinski et al. | |
| 7,933,090 B1 | | 4/2011 | Jung et al. | |
| 8,108,065 B2 | * | 1/2012 | Greco | ................ G11B 15/6835 |
| | | | | 700/214 |
| 8,406,096 B1 | | 3/2013 | Edling et al. | |

(Continued)

FOREIGN PATENT DOCUMENTS

JP 2009-070482 A 4/2009

OTHER PUBLICATIONS

Mayrhauser et al., "Using a neural network to predict test case effectiveness", IEEE Aerospace Applications Conference. Proceedings, Feb. 1995, pp. 77-91.

*Primary Examiner* — Fred Tzeng
(74) *Attorney, Agent, or Firm* — Invoke

(57) ABSTRACT

Techniques for determining a data tape read quality value are disclosed. A data tape system generates a value representing a quality of a data tape based on attributes of the data tape. The system calculates the data quality value using an algorithm based on: (a) a particular data tape error correction value, (b) data tape length value representing a length of data tape traversed during data-processing operations, and (c) a scaling factor. The scaling factor is based on a relationship between the particular data tape error correction value and a rate of degradation of the data tape. The scaling factor may be generated by applying a trained machine learning model to attributes of a data tape. The model generates a scaling factor for a particular data tape based on the attributes of the particular data tape.

20 Claims, 5 Drawing Sheets

(56) References Cited

U.S. PATENT DOCUMENTS

| | | |
|---|---|---|
| 8,730,778 B2 | 5/2014 | Wharton et al. |
| 8,842,384 B2 | 9/2014 | Jhatakia et al. |
| 8,849,782 B2 | 9/2014 | Black, III et al. |
| 8,849,783 B2 | 9/2014 | Abramovitz et al. |
| 8,849,784 B2 | 9/2014 | Alber et al. |
| 8,922,929 B1 | 12/2014 | Ruan et al. |
| 8,976,633 B1 | 3/2015 | Ruan et al. |
| 9,020,921 B2 | 4/2015 | Alber et al. |
| 9,099,162 B2 | 8/2015 | Alber et al. |
| 9,964,607 B1 | 5/2018 | Propes et al. |
| 10,460,757 B1* | 10/2019 | Judd .................. G11B 5/00813 |
| 10,497,401 B1* | 12/2019 | Liang ................. G11B 5/00817 |
| 10,566,022 B1* | 2/2020 | Judd .................. G11B 5/59633 |
| 10,679,658 B1* | 6/2020 | Winarski ............... G11B 15/00 |
| 10,818,314 B1* | 10/2020 | Miyamura ......... G11B 5/00813 |
| 11,562,267 B2 | 1/2023 | Polleri et al. |
| 2002/0154438 A1 | 10/2002 | Hirano et al. |
| 2005/0044451 A1 | 2/2005 | Fry et al. |
| 2007/0050569 A1* | 3/2007 | Haustein ............... G06F 3/0649 711/154 |
| 2007/0276991 A1 | 11/2007 | Jaquette et al. |
| 2008/0055776 A1 | 3/2008 | Findlay et al. |
| 2013/0083638 A1 | 4/2013 | Edling et al. |
| 2013/0339827 A1 | 12/2013 | Han et al. |
| 2014/0146650 A1 | 5/2014 | Alber et al. |
| 2014/0327985 A1* | 11/2014 | Bui ........................ G11B 5/012 360/71 |
| 2015/0117174 A1 | 4/2015 | Alber et al. |
| 2017/0206038 A1* | 7/2017 | Bates .................... G06F 3/0686 |
| 2018/0314442 A1* | 11/2018 | Tokai .................... G06F 3/0658 |
| 2019/0221234 A1 | 7/2019 | Peng et al. |
| 2020/0143830 A1* | 5/2020 | Judd ................. G11B 5/00813 |
| 2020/0227091 A1* | 7/2020 | Liang ................ G11B 5/00813 |
| 2021/0081492 A1* | 3/2021 | Higginson ............... G06N 5/02 |
| 2021/0406110 A1* | 12/2021 | Vaid ..................... G06F 18/251 |
| 2022/0067572 A1* | 3/2022 | Vaid ..................... G06F 18/214 |
| 2022/0366280 A1* | 11/2022 | Rowe .................... G06N 20/00 |
| 2023/0005499 A1 | 1/2023 | Jhatakia et al. |
| 2023/0005511 A1 | 1/2023 | Jhatakia et al. |

* cited by examiner

DATA TAPE QUALITY ANALYSIS

BENEFIT CLAIMS; RELATED APPLICATIONS; INCORPORATION BY REFERENCE

This application claims the benefit of U.S. Provisional Patent Applications 63/217,032, filed Jun. 30, 2021; 63/217,036, filed Jun. 30, 2021; and 63/217,040, filed Jun. 30, 2021, each of which are hereby incorporated by reference in their entirety.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to data tape quality analysis. In particular, the present disclosure relates to tuning a data tape quality algorithm based on measured characteristics of the data tape.

BACKGROUND

Magnetic tape storage provides cost and storage density advantages over many other data storage technologies. Data centers often utilize both tape storage and disk storage to complement each other. Tape storage is often used for backup and archival data storage. Disk storage is often used for more frequently accessed data storage.

Magnetic tape data storage ("data tape") uses digital recording on magnetic tape to store digital information. Tapes are packed in cartridges or cassettes. A tape drive performs read/write operations from/to the tape. A robotically-accessed tape library houses data tape cartridges to provide large quantities of data storage.

Over time, data tape quality may degrade. Degradation may be a result of physical wear in the data tape or data tape cartridge. Alternatively, the degradation may be a result of media errors, or errors in the data stored on the data tape. Data tape libraries employ monitoring systems to detect errors in read/write operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
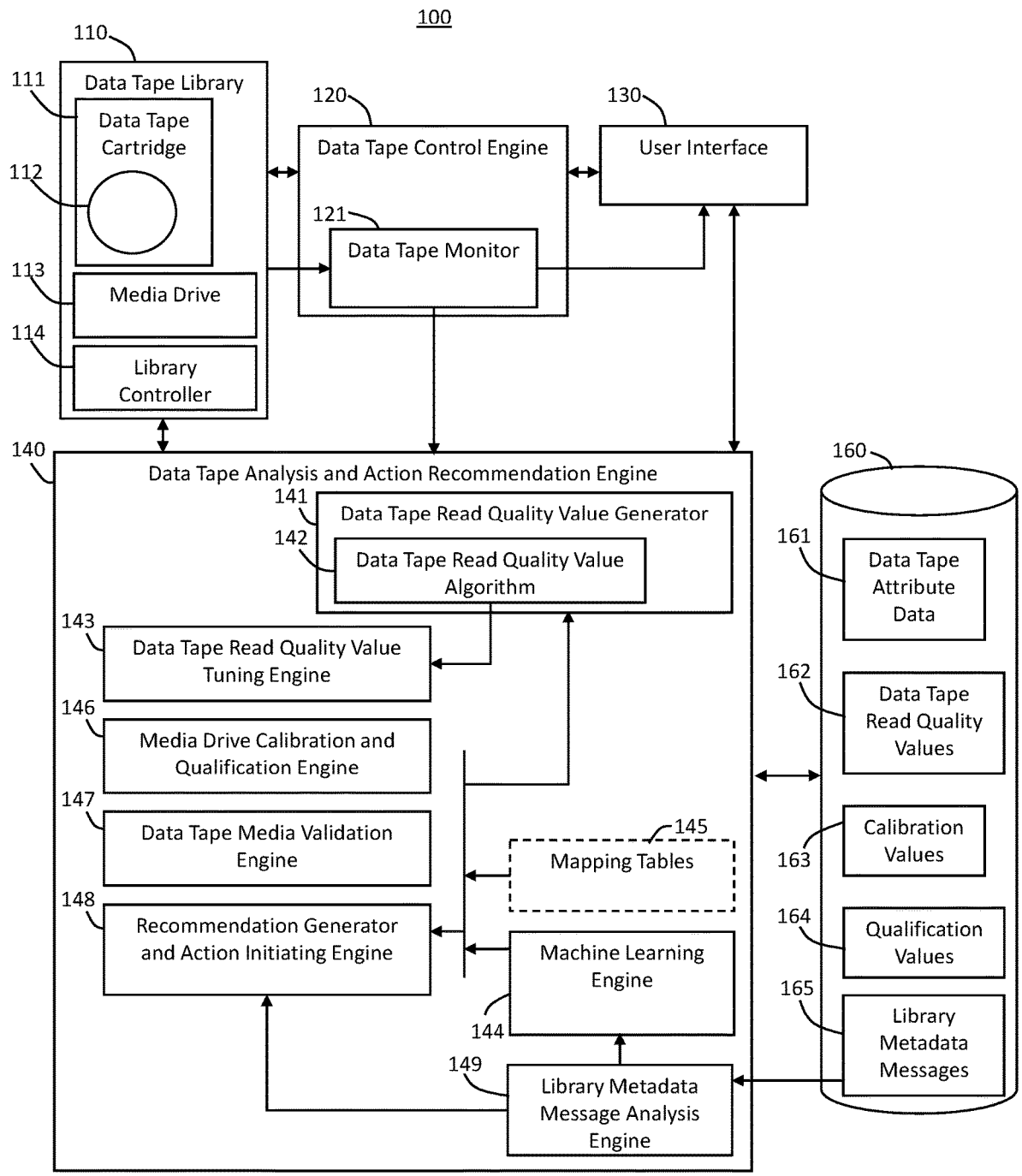
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. BRIEF SUMMARY
2. SYSTEM ARCHITECTURE
3. GENERATING DATA TAPE READ QUALITY VALUE USING DATA TAPE CHARACTERISTICS
4. TRAINING A MACHINE LEARNING MODEL
5. EXAMPLE EMBODIMENT
6. COMPUTER NETWORKS AND CLOUD NETWORKS
7. MISCELLANEOUS; EXTENSIONS
8. HARDWARE OVERVIEW

1. Brief Summary

Data tape libraries monitor operations of the data tapes to identify errors and failures in read/write operations from data tapes/to data tapes in the library. One or more embodiments include a data tape system that generates a value representing a quality of a data tape based on attributes of the data tape. For example, the system may calculate a data quality value using an algorithm based on: (a) a particular data tape error correction value, (b) data tape length value representing a length of data tape traversed during data-processing operations, and (c) a scaling factor. The scaling factor is based on a relationship between the particular data tape error correction value and a rate of degradation of the data tape. The scaling factor may be generated by applying a trained machine learning model to attributes of a data tape. The model generates a scaling factor for a particular data tape based on the attributes of the particular data tape. The scaling factor may be set by either a preproduction process (default scaling factor) or later as a sensitivity adjustment by a user or service provider. The scaling factor may also be set by an expert system via machine learning. The scaling factor may be derived from a set of exchanges between data tapes and media drives. In one embodiment, attributes of data tapes used to define a scaling factor for a particular data tape or set of data tapes is collected at the end of an exchange between a data tape and a media drive.

In one or more embodiments, a machine learning model is used to generate an expert system to identify a particular scaling factor for a data tape having a particular set of attributes. For example, a machine learning engine may be provided with a set of historical data tape attributes, such as data cartridge model, tape material, tape thickness, data recording format, environmental temperature, and environmental humidity. The machine learning engine may further be provided with historical data tape degradation information, including the frequency of a particular read error over time. The machine learning engine may generate data sets including data tape attributes and data tape degradation information. The machine learning engine trains a machine learning model to identify, for the different sets and variations of data tape attributes, a scaling factor corresponding to a rate at which the data tape degrades based on the frequency of the particular read error. The relationship between the sets data tape attributes and the scaling factors may be stored as an expert system in one or more data tables. Alternatively, the relationship between the sets of data tape attributes and the scaling factors may be embodied in a machine learning model by a machine learning algorithm. The machine learning model may be applied to a target set of data tape attributes in real-time to identify a scaling factor for the target set of data tape attributes. The system may identify a scaling factor for a particular data tape used in an exchange operation with a media drive.

In one or more embodiments, the system takes a particular action based on the calculated data tape read quality value. For example, the system may remove the tape from use, generate an alert for a user indicating a status of the tape, or tag the tape for another data tape quality measurement at a later time.

In one or more embodiments, the system calculates the data tape read quality value based on an algorithm that includes a degradation coefficient. The algorithm may raise a product of (a) the data tape error correction value and (b) the value representing the amount data processed to an exponent value equal to the scaling factor. The degradation coefficient may be applied to the product of the data tape error correction value and the value representing the amount of data processed to indicate a weight applied to the product to generate the data tape read quality value. The system may tune the degradation coefficient based on user input. Alternatively, the system may tune the degradation coefficient based on measuring a similarity of the particular data tape with other, previously measured, data tapes.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a data tape library 110, a data tape control engine 120, a user interface 130, a data tape analysis and action recommendation engine 140, and a data repository 160.

The data tape library 110 includes data tape cartridges 111 storing data tape 112. A library controller 114 controls physical access to the data tape cartridges 111. For example, the library controller 114 may control robot arms that locate a particular data tape cartridge 111 and provide the data tape cartridge 111 to a media drive 113 to read from/write to the data tape 112. The library controller 114 transmits read/write data to and from the data tape 112. In addition, the library controller 114 transmits metadata, including notifications and alerts, to the data tape control engine 120. The data tape control engine 120 controls read/write operations from/to the data tape library 110. The data tape control engine 120 includes a data tape monitor 121. As the data tape control engine 120 executes read/write operations, the data tape monitor 121 receives notifications and alerts associated with the success/failure of the read/write operations. Examples of alerts include hard error alerts, advisory alerts, and informational alerts. A hard error alert may be any error that prevents read/write operations, such as a total loss of the data tape, mechanical malfunction, media corruption, or extreme wear of the data tape.

In one embodiment, hard error alerts are generated by an application or program running on the data tape library. The hard error alert may include a recommendation that the data tape should not be used to store data. The hard error alert may also include a notice that the data tape is unusable, and a read/write operation could not be carried out. An advisory alert may indicate that an error occurred during a read/write operation, but that the operation was able to be performed successfully. The advisory alert may also provide a notice that information included in the data tape should be moved to another data tape in the near future. An informational-type alert occurs when a read/write operation occurs without any errors. For example, the library controller 114 may be configured to generate an informational alert when it determines a particular distance of data tape has been read. For example, if an amount of data written to/read from a data tape corresponds to a full wrap (traversing the tape from one end to the other), the library controller 114 may generate an informational-type alert. Informational alerts may also indicate a type of data tape cartridge 111 being read from/written to, that a particular tape has been in use for a particular amount of time, or any other information that does not necessarily include a tape failure or data read/write error.

In addition to generating commands to read from/write to a data tape 112 in the data tape library 110, the data tape control engine 120 may also control operating modes and monitoring commands of the data tape library 110. For example, in a data tape analysis operating mode, the data tape control engine 120 may issue calibration commands, qualification commands, data tape quality measurement commands, or media quality commands. For example, an operator may access a graphical user interface (GUI) displayed by the user interface 130 to request a media validation of a particular data tape 112 in the data tape library 110. In the data tape analysis operating mode, the library controller 114 may return data about the state of the data tape 112 included in the media validation request without receiving any write data from the data tape control engine 120 and without transmitting any read data to the data tape control engine 120.

The data tape analysis and action recommendation engine 140 analyzes data generated by the library controller 114 and the data tape monitor 121 of the data tape control engine 120. The data tape analysis and action recommendation engine 140 includes a data tape read quality value generator 141, a data tape read quality value tuning engine 143, a media drive calibration and qualification engine 146, and a data tape media validation engine 147.

The data tape read quality value generator 141 generates a data tape read quality value based on a data tape read quality value algorithm 142. The data tape read quality value algorithm 142 includes values representing (a) a particular data tape error correction value, (b) a particular value representing an amount of read data, and (c) a scaling factor. In one embodiment, the particular data tape error correction value is a filtered "total corrected read errors" value. The "total corrected read errors" value represents a type of read error requiring physical rewinding of the data tape to re-read a portion of the data tape that was previously read, but which resulted in an error. Filtering the total corrected read errors value includes omitting from the value the re-reads that are not necessarily the result of read errors. For example, if a tape drive is known to re-read portions of the data tape when first beginning a read operation, the re-read operations at the beginning of the read operation may be omitted from the filtered "total corrected read errors" value. Otherwise, the total corrected read errors value may be artificially inflated.

The system may track an amount to data read from the data tape in read operations and/or written to the data tape in write operations to obtain the value representing an amount of data processed. Alternatively, the system may derive the value representing the amount of data processed by tracking a length of tape read from or written to, and deriving, based on a known amount of data per distance, the amount of data read from/written to the data tape.

The scaling factor is a numerical value which represents a relationship between the data tape error correction value, the value representing the amount of data processed in read/write operations of the data tape, and a degradation level of the data tape. The data tape analysis and recommendation engine 140 includes a data tape read quality value tuning engine 143. The data tape read quality value tuning engine 143 adjusts the scaling factor for a particular data tape or set of data tapes based on data tape attribute data 161. Example data tape attribute data 161 includes: a type of data tape, a brand of data tape, a material making up the data tape, dimensions of the data tape (such as thickness, width, length), media characteristics (such as compression levels, amount of data stored, number of over-writes on the data tape), and environmental attributes (such as humidity, temperature, light levels, and magnetic field strengths of an environment in which the data tape is stored). For example, for a particular brand of data tape, storage at a higher temperature and humidity may cause the data tape to degrade more rapidly when the data tape is frequently accessed for data re-reads and re-writes. In an embodiment in which a machine learning model generates a scaling factor, the data tape read quality value tuning engine 143 provides feedback to the machine learning model engine during training of the model. Based on the feedback, the machine learning model engine updates a training data set and re-trains the model.

In one embodiment, the data tape read quality value algorithm 142 may be represented as:

$DTQ = 90 - \alpha*(2*TCREF/WR)^\beta$, where DTQ is the data tape read quality value, $\alpha$ is a degradation co-efficient, TCREF is a filtered total corrected read error value, WR is a "wraps read" value, corresponding to the value representing the amount of read data tape, and $\beta$ is the scaling factor.

In the above equation, the value "90" defines a range of values for the data tape read quality value. However, embodiments encompass any range of values. The range of potential values for a data tape quality may be set by a user, for example. The degradation coefficient is a value less than 90 that defines how much the "errors per distance" calculations (raised to the scaling factor) will increase/reduce the data tape read quality value. For example, if the degradation coefficient is set to "20," then the final data tape read quality value will be calculated as the "errors per distance" times 20. The degradation coefficient may be set by a user, for example, to cause the data tape read quality values to fall along a desired range of values.

While the above embodiment describes a data tape read quality value based on data read from the data tape, one or more embodiments include generate a data tape quality value that incorporates write quality data for a data tape. For example, the system may identify a ratio of an actual density of recorded data to a maximum recordable density in an error-free scenario. Accordingly, one or more embodiments include generating a data tape quality value based on read/write data of a data tape.

In one embodiment, the data tape analysis and recommendation engine 140 includes a machine learning engine 144 for training a machine learning model to generate, for a particular set of data tape attributes, a scaling factor value. For example, the machine learning engine 144 may generate a training data set from the data tape attribute data 161 to identify sets of data tape attributes and corresponding scaling factor values. The machine learning model may be trained to identify relationships among different data tape attributes and scaling factor values. In an alternative embodiment, the data tape analysis and recommendation engine 140 maps a particular data tape attribute or set of attributes to a particular scaling factor using a mapping table 145. The mapping table 145 may include, for example, fields representing ranges of values for data tape attributes and scaling factor values associated with the ranges of values.

The media drive calibration and qualification engine 146 performs a media drive calibration on a designated media drive 113 in the data tape library 110. For example, a data tape library 110 may include multiple media drives 113. One or more of the media drives may be designated as "validation" drives. These drives may be calibrated, using a data tape cartridge 111 having known attributes, to ensure the media drive 113 designated as a validation drive meets a threshold operation status. In addition, the validation drive may be inaccessible to host applications that read from and write to data tapes 112 in the data tape library 110. Instead, the validation drive may be accessible only by the library controller 114 for carrying out calibration, qualification (ensuring continued calibration of the media drive), and validation operations. Consequently, when a media validation is requested for a particular data tape 112, the library controller 114 selects, from among the multiple media drives 113, the media drive that is calibrated and designated as the validation drive. Since the validation drive has been calibrated, the result of the media validation operation is more likely to accurately reflect a state of the media, and not necessarily a state of the validation drive.

The data tape media validation engine 147 determines an operating state of a particular data tape 112 in the data tape library 110. The validation operation may be initiated by a user, by a pre-defined schedule, or by any triggering event detected by the library controller 114 or the data tape monitor 121. For example, a data tape control engine 120 may store a set of rules for determining when a validation is performed. The set of rules may include one rule to perform a validation of the data tape 112 after a predetermined number of uses of a data tape 112, another rule to perform a validation of the data tape 112 after a predetermined period of time has elapsed, and another rule to perform a validation of the data tape 112 after a predetermined number of read/write errors is detected when reading from or writing to the data tape 112.

In one embodiment, the data tape analysis and recommendation engine 140 includes a recommendation generator and action initiating engine 148. The recommendation generator and action initiating engine 148 makes action recommendations and initiates system actions for a data tape based on (1) data tape attribute data 161, (2) data tape read quality values 162, and (3) library metadata messages 165. When calibration and/or qualification operations have been performed, the action recommendations and system actions may further be generated/initiated based on media drive calibration values 163 and media drive qualification values 164.

In one embodiment, the recommendation generator and action initiating engine 148 generates a recommendation or initiates an action based on a trained machine learning model. The machine learning engine 144 may train a machine learning model to generate, for a particular data tape, an action recommendation. For example, the machine learning engine 144 may generate a training data set from the data tape attribute data 161, data tape read quality values 162, and library metadata messages 165 to identify action recommendations associated with particular sets of data tape attribute data 161, data tape read quality values 162, and library metadata messages 165. The machine learning model may be trained to identify relationships among different data tape attribute data 161, data tape read quality values 162, and metadata messages 165 and action recommendations. In addition, the machine learning engine 144 may train the machine learning model based on data indicating whether a prescribed action resulted in a successful correction of an error or not. For example, the training data set may include the data tape attribute data 161, data tape read quality values 162, and metadata messages 165, as well as an indication of the historical action recommended for the set of data tape attributes and an indication of whether the historical recommended action resulted in successful resolution of a detected error.

In an alternative embodiment, the data tape analysis and action recommendation engine 140 maps a particular set of data tape attribute data 161, data tape read quality values 162, and metadata messages 165 to a particular action recommendation using a mapping table 145. The mapping table 145 may include, for example, fields representing ranges of values for data tape attributes and scaling factor values associated with the ranges of values.

In one embodiment, the data tape analysis and action recommendation engine 140 includes a library metadata message analysis engine 149. The library metadata message analysis engine 149 may analyze a library metadata message 165 and determine whether to bypass a machine learning engine 144. For example, if the data tape control engine 120 controls the data tape media validation engine 147 to initiate a media validation of a particular data tape 112, the library controller 114 may generate a hard error metadata message. The hard error metadata message may indicate that the selected data tape is no longer usable by host applications for read or write operations. Based on the particular type of library metadata message, the library metadata message analysis engine 149 may transmit the library metadata message directly to the recommendation generator and action initiating engine 148 without applying a machine learning algorithm to an input data set including the library metadata message.

In one embodiment, the recommendation generator and action initiating engine 148 stores one or more tables indicating prescribed recommendations and actions for particular sets of data tape attributes data 161, data tape read quality values 162, and library metadata messages 165. The one or more tables may be generated by a machine learning model trained by the machine learning engine 144 to function as an expert system. The machine learning engine 144 may train a machine learning model to analyze historical data including the data tape attribute data 161, data tape read quality values 162, and library metadata messages 165 associated with previously-encountered or analyzed data tapes. The historical data may also be obtained from additional sources, such as online libraries including historical data tape information. The machine learning engine 144 trains the machine learning model based on the historical data to generate, for different combinations of input data, corresponding action recommendations. The recommendation generator and action initiating engine 148 stores the action recommendations in the one or more tables. Upon encountering a particular set of data tape attribute data 161, data tape read quality values 162, and library metadata messages 165 resulting from a data tape media validation operation, the recommendation generator and action initiating engine 148 consults the one or more tables to generate a recommendation or to initiate an action.

In one embodiment, one or more of the library metadata messages 165 may include a default recommendation. For example, the library controller 114 may generate a library metadata message indicating that a particular read error occurred and recommending cleaning of a media drive. However, the recommendation generator and action initiating engine 148 may generate a different recommendation by taking into account not only the library metadata message, but also a data tape read quality value, a data tape media validation value, and a calibration value of a media drive. A machine learning model may determine that, for the particular set of input data cleaning the media drive would not necessarily resolve the error. Instead, the machine learning model may recommend cleaning a data tape.

Examples of recommendations generated by the recommendation generator and action initiating engine 148 include: (1) use a different media drive for the requested operation, (2) migrate data from the data tape to another data tape, (3) an end-of-life metric has been detected: migrate data to another data tape, (4) data tape quality is less than quality required for the stored media—replace the data tape with one of a higher quality grade, (5) wrong type of data tape detected for requested operation—change data tape, (6) data drive is incompatible with data tape—change to another data drive and repeat operation, (7) data tape read failure—migrate data to another data tape and do not use data tape, (8) recommendation not possible—type of error unknown, (9) clean media drive, (10) clean data tape, (11) re-run requested operation, (12) data encryption error encountered—re-run requested operation.

In one or more embodiments, interface 130 refers to hardware and/or software configured to facilitate communications between a user and the data tape control engine 120 and data tape analysis and recommendation engine 140. Interface 130 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 130 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 130 is specified in one or more other languages, such as Java, C, or C++.

In one or more embodiments, a data repository 160 is any type of storage unit and/or device (e.g., a file system, database, collection of tables, or any other storage mechanism) for storing data. Further, a data repository 160 may include multiple different storage units and/or devices. The multiple different storage units and/or devices may or may not be of the same type or located at the same physical site. Further, a data repository 160 may be implemented or may execute on the same computing system as the data tape control engine 120, the data tape library 110, or the data tape analysis and recommendation engine 140. Alternatively, or additionally, a data repository 160 may be implemented or executed on a computing system separate from the data tape control engine 120, the data tape library 110, or the data tape analysis and recommendation engine 140. A data repository 104 may be communicatively coupled to the data tape control engine 120, the data tape library 110, or the data tape analysis and recommendation engine 140 via a direct connection or via a network.

Information describing the data tape attribute data 161, data tape read quality values 162, calibration values 163, qualification values 164, and library metadata messages 165 may be implemented across any of components within the system 100. However, this information is illustrated within the data repository 160 for purposes of clarity and explanation.

Figure 2:
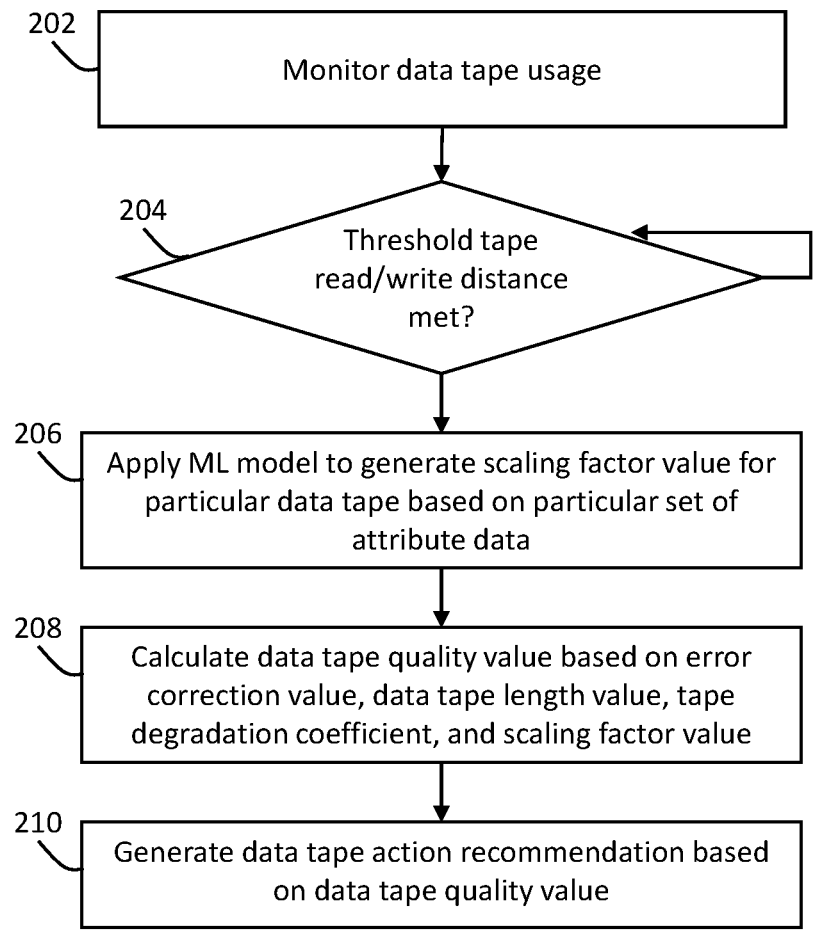
FIG. 2 illustrates an example set of operations for generating a data tape read quality value in accordance with one or more embodiments.
Figure 3:
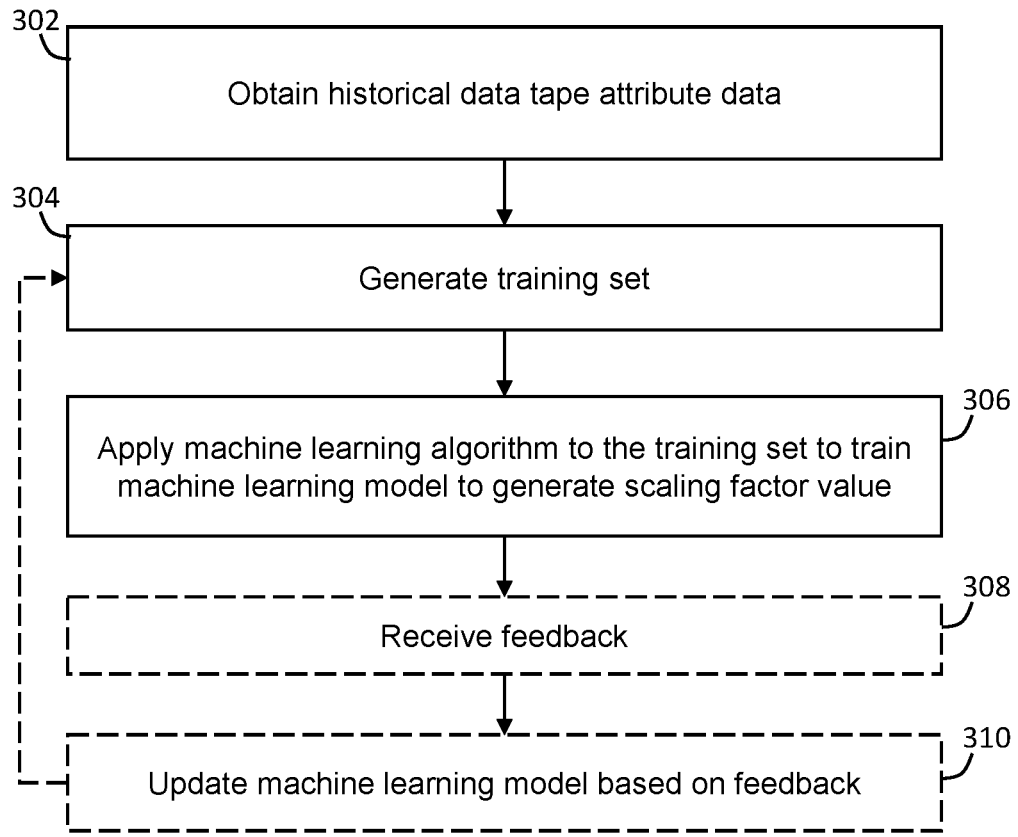
FIG. 3 illustrates an example set of operations for training a machine learning model in accordance with one or more embodiments.

In one or more embodiments, the data tape control engine 120, the data tape library 110, or the data tape analysis and recommendation engine 140 refers to hardware and/or software configured to perform operations described herein for managing a data tape library 110 and analyzing data tapes. Examples of operations for analyzing data tapes of a data tape library are described below with reference to FIG. 2.

In an embodiment, the data tape control engine 120, the data tape library 110, or the data tape analysis and action recommendation engine 140 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

3. Generating Data Tape Read Quality Value Based on Data Tape Characteristics A system monitors usage of data tapes (Operation 202). For example, the system may keep track of a frequency with which data tapes in a data tape library are accessed. The system may track a volume of processed data for each data tape. The system may further track a tape distance of tape that is read from, and/or written to, for each data tape.

The system determines if a threshold data tape attribute has been met (Operation 204). For example, the system may determine if a minimum tape read/write distance threshold has been met for a particular data tape. The system may determine that, after twenty read or write operations to a data tape, the amount of read/written data corresponds to the wrap distance of the data tape, or a distance from one end of the data tape to the opposite end. The system may track a distance value by keeping track of the revolutions of the data tape. Alternatively, the system may derive the distance value by keeping track of the amount of data read from/written to a data tape, and calculating the distance value based on the amount of data read/written divided by the amount of potential data storage on the data tape. The system may determine whether the threshold data tape attribute has been met by assigning a particular weight to a read operation versus a write operation. For example, since a read operation may result in less wear on a data tape, the system may apply a greater weight to write or erasure operations than to read operations when determining whether a threshold data tape attribute has been met.

If the system determines that the data tape attribute threshold has been met for a particular data tape, the system obtains or generates a scaling factor value for the particular data tape (Operation 206). In one embodiment, the system applies a trained machine learning model to the particular attributes of the particular data tape to generate a particular scaling factor value. In another embodiment, the system identifies a scaling factor value associated with the particular data tape by referring to a previously-generated mapping table. For example, a machine learning model may be used to generate a mapping table that maps scaling factors for twenty different classes of data tapes based on historical attribute data associated with the data tapes. The system may determine the scaling factor for a particular data tape by referring to the mapping table.

For example, the table may be divided into categories based on a number of write operations performed. One category associated with a scaling factor of "0.4" may include 1,000 write operations and a tape traverse distance of at least 40 meters. Another category associated with a scaling factor of "0.6" may include 1,500 write operations and the tape traverse distance of at least 40 meters. While a simplified table is described above for purposes of clarity, embodiments encompass tables with additional attributes, including: number of write operations, amount of write data, tape distance associated with amount of write data, number of read operations, amount of read data, tape distance associated with amount of read data, number of erasure operations, amount of data erased, tape distance associated with amount of data erased, age of data tape, data tape type, data tape material, data encoding type on data tape, etc.

The system calculates the data tape read quality value for the data tape (Operation 208). The system calculates the data tape read quality value for the data tape based on (a) a particular error correction value for the data tape, (b) a data tape length value representing a length of data tape traversed during data processing operations, and (c) the scaling factor for the data tape. In one embodiment, the system refrains from calculating the data tape read quality value for a particular data tape until the data tape has met a minimum tape read/write distance threshold or other data tape attribute threshold.

In one or more embodiments, the data tape read quality value is calculated after an exchange between a data tape and a media drive is completed. In other words, the system may refrain from collecting data tape attribute data, including a read/write distance traversed, while a data tape is mounted in a media drive.

The system generates an action recommendation for the data tape based on the data tape read quality value (Operation 210). For example, the system may generate a notification to an operator to inform the operator of a status of the data tape. Alternatively, or in addition, the system may prevent additional write operations to the data tape based on a highly-degraded state of the data tape. The system may also generate a recommendation to migrate data from the data tape to another data tape immediately, or within a certain period of time.

4. Training a Machine Learning Model

A system obtains historical data tape attribute data (Operation 302). The historical data tape attribute data includes data associated with historical exchanges between data tapes and media drives. For each exchange, the system may identify: (a) a brand of data tape being accessed in a media access operation, (b) particular characteristics of the data tape, such as length, width of tape, tape material, tape thickness, and (c) historical quality information about the data tape. The system may further identify environmental conditions in which the tape is stored, such as temperature, humidity, and electromagnetic activity. Data tape attribute data may be obtained from one or more databases, data repositories, or product specifications. In addition, or in the alternative, data tape attribute data may be measured by the system. The system may collect and store additional data tape attribute data after each exchange between a data tape and a media drive in the system. The system may add the newly-obtained attribute data to the historical data tape attribute data. Examples of data tape attribute data include a number of write operations, amount of write data, tape distance associated with amount of write data, number of read operations, amount of read data, tape distance associated with amount of read data, number of erasure operations, amount of data erased, tape distance associated with amount of data erased, age of data tape, data tape type, data tape material, and data encoding type on data tape.

The system generates a training data set (Operation 204). The training data set includes a plurality of pairs of (a) historical data tape attribute data for a particular data tape, and (b) a scaling factor associated with the particular historical data tape attribute data. The historical data tape attribute data from which the training data set is generated may include the attribute data of other data tapes in a data tape library, of data tapes in other data tape libraries, and other attribute data from data tapes within the system or in other systems. For example, the system may access a database via a network, such as the Internet, to obtain attribute data for other data tapes. The historical scaling factors may be human-generated or machine-generated by machine learning models associated with the historical data tape systems.

The system trains the machine learning model by applying a machine learning algorithm to identify relationships between different data tape attributes and respective scaling factor values (Operation 306). The machine learning algorithm analyzes the training data set to identify data and patterns between sets of data tape attributes and scaling factor values. Examples of types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In examples of supervised machine learning algorithms, the system may obtain feedback on the scaling factor values for sets of data tape attributes (operation 308). The feedback may affirm that a generated scaling factor value corresponds to the set of data tape attributes. In other examples, the feedback may indicate that a generated scaling factor value is not valid for a particular set of data tape attributes. In this latter situation, the scaling factor may be adjusted upwards or downwards, or un-associated entirely. Based on the detected similarities and/or feedback, the machine learning training set may be updated, thereby improving its analytical accuracy (Operation 310). Once updated, the ML model may be further training by optionally applying it to additional training materials.

In one or more embodiments, a system includes a data tape read quality value tuning engine to provide feedback to the machine learning engine during training. The data tape read quality value tuning engine may identify a set of predefined data tape read quality values based on known data tape attributes. The data tape read quality value tuning engine may apply a scaling factor generated by the machine learning model during training to a data tape read quality value algorithm to generate a data tape read quality value. The data tape read quality value tuning engine may compare the data tape read quality value generated based on the machine-learning-generated scaling factor with a desired data tape read quality value. The data tape read quality value tuning engine may calculate a difference between a target scaling factor, associated with a target data tape read quality value, and the machine-learning model generated scaling factor. The data tape read quality value tuning engine may provide data associated with the target scaling factor—such as providing the target scaling factor, itself, or providing difference data—to the machine learning model engine. Based on the data associated with the target scaling factor, the machine learning model updates the training data set and re-trains the machine learning model.

As an example, the historical data tape attribute data may include a range of different data tape read quality values and different scaling factors for data sets that include (a) a particular write error, and (b) a particular amount of write data written to a data tape. The data tape read quality value tuning engine may identify a particular data tape read quality value to be applied to each data set that includes (a) the particular write error and (b) the particular amount of write data written to the data tape. When the machine learning model generates a scaling factor for a set of historical data that includes (a) the particular write error and (b) the particular amount of write data written to the data tape, the data tape read quality value tuning engine provides feedback data to the machine learning model engine to adjust the scaling factor in the training data set such that a resulting data tape read quality value matches a target data tape read quality value for the set of historical data.

Upon completion of the training, the system applies the trained machine learning model to particular sets of attribute data associated with a particular data tapes to generate scaling factor values for the particular data tapes. The scaling factor values represent the historically-observed relationship between the frequency of a particular read/write error, or set of read/write errors, and a degradation of the data tape.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
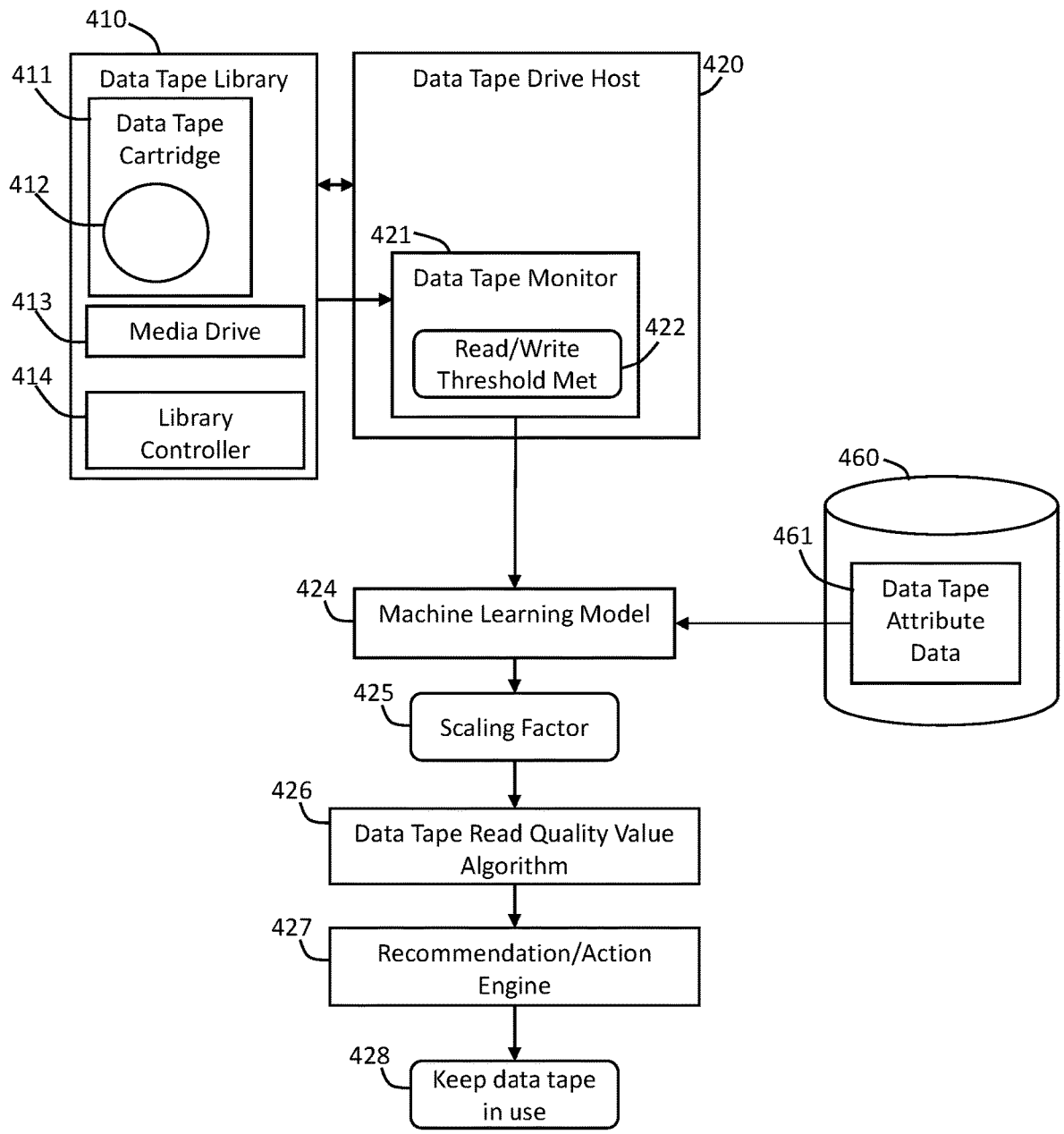
FIG. 4 illustrates an example embodiment of a system for generating a data tape read quality value.

FIG. 4 illustrates a system that generates a data tape recommendation based on a machine-learning-generated scaling factor, according to an example embodiment.

The data tape drive host 420 provides commands to the library controller 414 to perform a read or write operation on the data tape 412 of the data tape cartridge 411. The library controller 414 controls a robot arm of the data tape library 410 to access the data tape cartridge 411 and insert the data tape cartridge 411 into a media drive 413 to perform the read or write operation. Once the data tape cartridge 411 is loaded into the media drive 413, the data tape drive host 420 communicates with the media drive 413 to perform the read/write operations. Upon completion of the read/write operation, the library controller 414 de-mounts the data tape cartridge 411 from the media drive 413. The library controller 414 detects performance information, such as whether read/write operations were successful, error data, and other performance notifications. A data tape monitor 421 receives from the library controller 414 the performance information associated with the read or write operation. If the operation results in a hard error, such as an inability of the media drive 413 to write to or read from the data tape 412, the data tape monitor 421 receives an alert from the library controller 414. The alert may include a recommended action.

In the embodiment illustrated in FIG. 4, the data tape library 410 generates a notification of a successful write operation with an error code indicating a portion of the write operation had to be re-tried multiple times before the write was successful. The notification may include a recommendation to replace the data tape cartridge 411 by copying the data contained on the data tape 412 onto a new data tape. According to the embodiment illustrated in FIG. 4, the system performs an additional analysis of the data tape 412 to provide a separate recommendation for the data tape 412. The recommendation is based not only on a result of an immediate read/write/erase operation, but on additional data tape attribute data 461.

Upon completion of the write operation, the data tape monitor 421 determines that the data tape 412 met a read/write threshold value 422. For example, the data tape monitor 421 may access data tape attribute data 461 in the data repository 460. The data tape attribute data 461 may include an amount of data written to the data tape 412 over the course of twenty write operations performed over a time period of three years. The data tape monitor 421 may update the data tape attribute data 461 upon completion of a read, write, or erasure operation to include the results of the present write operation.

Based on determining that the data tape cartridge 411 has met a data read or write threshold value 422, the data tape monitor 421 provides the read/write data, such as the total amount of data written to the data tape 412, to the machine learning model 424. The system provides additional data tape attribute data 461 to the machine learning model. The additional data tape attribute data 461 includes, for example, a type of data tape, a brand of data tape, a material making up the data tape, dimensions of the data tape (such as thickness, width, length), media characteristics (such as compression levels, amount of data stored, number of over-writes on the data tape), and environmental attributes (such as humidity, temperature, light levels, and magnetic field strengths of an environment in which the data tape is stored).

For example, for a particular brand of data tape, storage at a higher temperature and humidity may cause the data tape to degrade more rapidly when the data tape is frequently accessed for data re-reads and re-writes.

Based on the set of input data, the machine learning model 424 generates a scaling factor 425 for the data tape 412. The scaling factor 425 is a numerical value which represents a relationship between the data tape error correction value, the value representing the amount of data processed in read/write operations of the data tape, and a degradation level of the data tape.

The system calculates a data tape read quality value for the data tape 412 based on an algorithm 426 that includes the scaling factor 425. The algorithm includes a degradation coefficient. The algorithm raises a product of (a) the data tape error correction value and (b) the value representing the amount data processed, to an exponent value equal to the scaling factor. The degradation coefficient is applied to the product of the data tape error correction value and the value representing the amount of data processed to indicate a weight applied to the product to generate the data tape read quality value.

In the example embodiment illustrated in FIG. 4, the data tape quality algorithm 426 is represented as:

$DTQ=90-\alpha*(2*TCREF/WR)^\beta$, where DTQ is the data tape read quality value, $\alpha$ is a degradation co-efficient, TCREF is a filtered total corrected read error value, WR is a "wraps read" value, corresponding to the value representing the amount of read data tape, and $\beta$ is the scaling factor. In the above equation, the value "90" defines a range of values for the data tape read quality value. However, embodiments encompass any range of values. The range of potential values for a data tape quality may be set by a user, for example. The degradation coefficient is a value less than 90 that defines how much the "errors per distance" calculations (raised to the scaling factor) will increase/reduce the data tape read quality value. For example, if the degradation coefficient is set to "20," then the final data tape read quality value will be calculated as the "errors per distance" times 20. The degradation coefficient may be set by a user, for example, to cause the data tape read quality values to fall along a desired range of values.

The system provides the data tape read quality value to a recommendation and/or action engine 427. In the example embodiment illustrated in FIG. 4, the recommendation and/or action engine 427 recommends that the data tape cartridge 411 remain in use. In other words, while a default recommendation generated by a data tape library 410 based on an error code or notification code may recommend replacing a data tape 412 based on occurrence of a particular error, the recommendation 428 based on the scaling factor 425 generated by the machine learning model 424 takes into account more data tape attribute data 461 than just the data that led to a particular error. Accordingly, the recommendation 428 may differ from the default recommendation generated by the data tape library 410.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
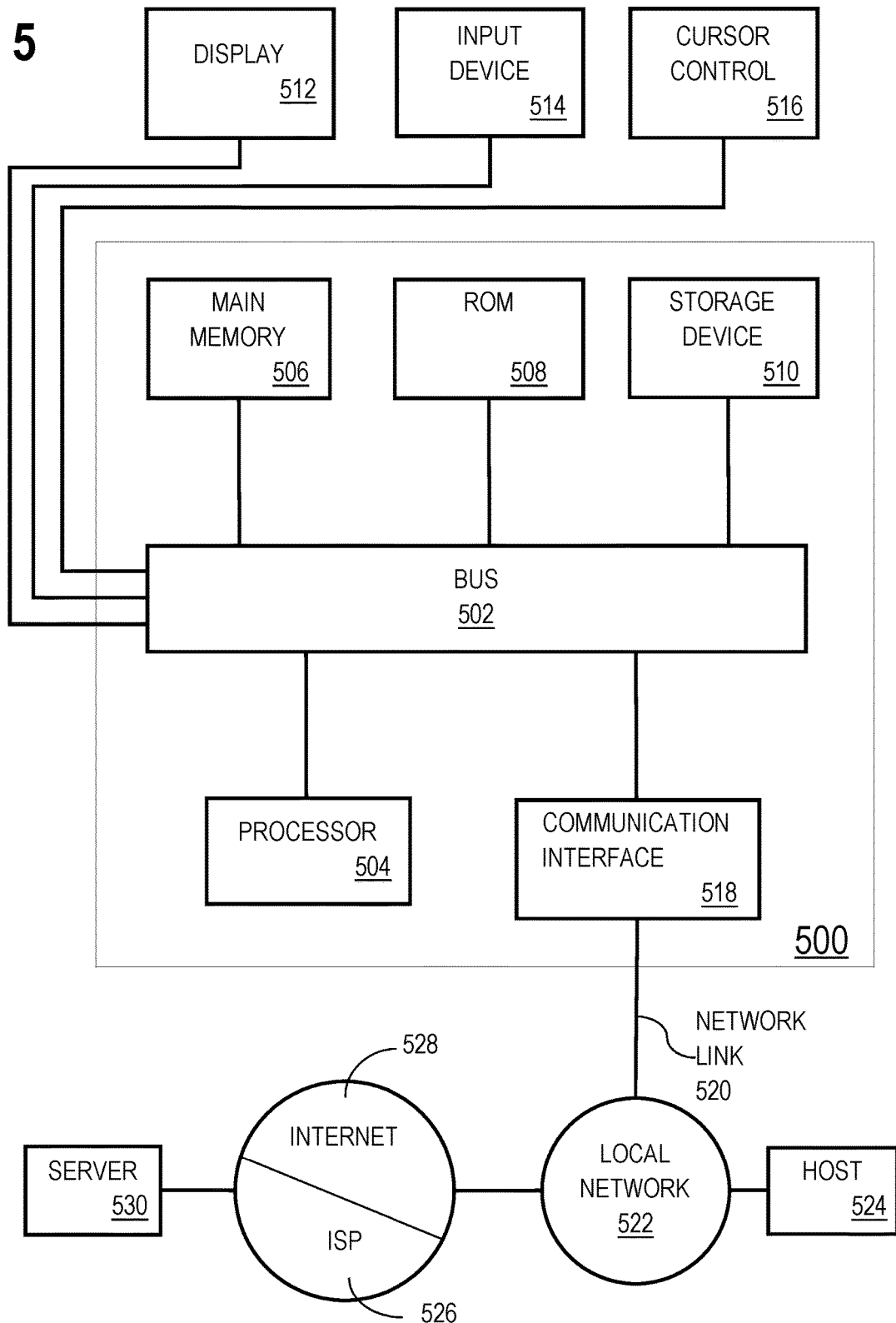
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   generating a data tape error correction value based on a frequency of a data tape experiencing a particular data tape error;
   generating a data tape read quality value based on: (a) the data tape error correction value, (b) a data tape length value representing a length of the particular data tape traversed during data-processing operations, and (c) a scaling factor value based on a relationship between the particular data tape error, the data tape length value, and a degradation rate of the data tape;
   wherein generating the scaling factor value comprises:
      obtaining data tape attribute data for the data tape, the data tape attribute data corresponding to at least one of: (a) characteristics of the data tape, and (b) characteristics of an environment in which the data tape is located; and
   applying a trained machine learning model to the data tape attribute data to generate the scaling factor value based on the data tape attribute data.

2. The non-transitory computer readable medium of claim 1, wherein the operations further comprise:
   monitoring data tape processing operations of a data tape library to determine whether data processing characteristics of data tapes meet a threshold;
   subsequent to a data processing operation, determining that a data processing characteristic of a data tape associated with the data processing operation meets the threshold; and responsive to determining that the data processing characteristic of the data tape meets the threshold, generating the data tape error correction value and the data tape read quality value.

3. The non-transitory computer readable medium of claim 1, wherein the operations further comprise:
based on determining the data tape read quality value is less than a threshold, performing at least one of:
preventing a write operation from being performed on the data tape; and
generating an alert including a degradation state of the data tape.

4. The non-transitory computer readable medium of claim 1, wherein the data tape read quality value is based on an algorithm including a first portion in which a quotient of the data tape error correction value and the data tape length value is raised to an exponent equal to the scaling factor.

5. The non-transitory computer readable medium of claim 4, wherein the algorithm further includes a degradation coefficient,
wherein generating the data tape read quality value includes multiplying the first portion by the degradation coefficient.

6. The non-transitory computer readable medium of claim 1, wherein the operations further comprise:
obtaining historical data tape data for a plurality of data tapes;
generating a training data set comprising:
a plurality of data points associated with a plurality of sets of data tape attributes, and
for each data point of the plurality of data points, a respective historical scaling factor value; and
training the machine learning model based on the training data set to recommend a particular scaling factor value for a particular set of data tape attributes.

7. The non-transitory computer readable medium of claim 6, wherein training the machine learning model comprises:
generating a first scaling factor value for a first data point associated with a first set of data tape attributes;
generating a first data tape read quality value using the first scaling factor value and the first set of data tape attributes;
comparing the first data tape read quality value to a predefined data tape read quality value for the first set of data tape attributes; and
based on detecting a difference between the first data tape read quality value and the predefined data tape read quality value:
calculating a difference between a predefined scaling factor value, associated with the predefined data tape read quality value, and the first scaling factor value;
updating the training data set based on the difference between the predefined scaling factor value and the first scaling factor value; and
retraining the machine learning model based on updating the training data set.

8. A method comprising:
generating a data tape error correction value based on a frequency of a data tape experiencing a particular data tape error;
generating a data tape read quality value based on: (a) the data tape error correction value, (b) a data tape length value representing a length of the particular data tape traversed during data-processing operations, and (c) a scaling factor value based on a relationship between the particular data tape error, the data tape length value, and a degradation rate of the data tape;
wherein generating the scaling factor value comprises:
obtaining data tape attribute data for the data tape, the data tape attribute data corresponding to at least one of: (a) characteristics of the data tape, and (b) characteristics of an environment in which the data tape is located; and
applying a trained machine learning model to the data tape attribute data to generate the scaling factor value based on the data tape attribute data.

9. The method of claim 8, further comprising:
monitoring data tape processing operations of a data tape library to determine whether data processing characteristics of data tapes meet a threshold;
subsequent to a data processing operation, determining that a data processing characteristic of a data tape associated with the data processing operation meets the threshold; and
responsive to determining that the data processing characteristic of the data tape meets the threshold, generating the data tape error correction value and the data tape read quality value.

10. The method of claim 8, further comprising:
based on determining the data tape read quality value is less than a threshold, performing at least one of:
preventing a write operation from being performed on the data tape; and
generating an alert including a degradation state of the data tape.

11. The method of claim 8, wherein the data tape read quality value is based on an algorithm including a first portion in which a quotient of the data tape error correction value and the data tape length value is raised to an exponent equal to the scaling factor.

12. The method of claim 11, wherein the algorithm further includes a degradation coefficient,
wherein generating the data tape read quality value includes multiplying the first portion by the degradation coefficient.

13. The method of claim 8, wherein the operations further comprise:
obtaining historical data tape data for a plurality of data tapes;
generating a training data set comprising:
a plurality of data points associated with a plurality of sets of data tape attributes, and
for each data point of the plurality of data points, a respective historical scaling factor value; and
training the machine learning model based on the training data set to recommend a particular scaling factor value for a particular set of data tape attributes.

14. The method of claim 13, wherein training the machine learning model comprises:
generating a first scaling factor value for a first data point associated with a first set of data tape attributes;
generating a first data tape read quality value using the first scaling factor value and the first set of data tape attributes;
comparing the first data tape read quality value to a predefined data tape read quality value for the first set of data tape attributes; and
based on detecting a difference between the first data tape read quality value and the predefined data tape read quality value:
calculating a difference between a predefined scaling factor value, associated with the predefined data tape read quality value, and the first scaling factor value;

updating the training data set based on the difference between the predefined scaling factor value and the first scaling factor value; and retraining the machine learning model based on updating the training data set.

15. A system comprising:

one or more processors; and memory storing instructions that, when executed by the one or more processors, cause the system to perform operations comprising:

generating a data tape error correction value based on a frequency of a data tape experiencing a particular data tape error;

generating a data tape read quality value based on: (a) the data tape error correction value, (b) a data tape length value representing a length of the particular data tape traversed during data-processing operations, and (c) a scaling factor value based on a relationship between the particular data tape error, the data tape length value, and a degradation rate of the data tape;

wherein generating the scaling factor value comprises:
obtaining data tape attribute data for the data tape, the data tape attribute data corresponding to at least one of: (a) characteristics of the data tape, and (b) characteristics of an environment in which the data tape is located; and applying a trained machine learning model to the data tape attribute data to generate the scaling factor value based on the data tape attribute data.

16. The system of claim 15, wherein the operations further comprise:

monitoring data tape processing operations of a data tape library to determine whether data processing characteristics of data tapes meet a threshold;

subsequent to a data processing operation, determining that a data processing characteristic of a data tape associated with the data processing operation meets the threshold; and responsive to determining that the data processing characteristic of the data tape meets the threshold, generating the data tape error correction value and the data tape read quality value.

17. The system of claim 15, wherein the operations further comprise:

based on determining the data tape read quality value is less than a threshold, performing at least one of:
preventing a write operation from being performed on the data tape; and
generating an alert including a degradation state of the data tape.

18. The system of claim 15, wherein the data tape read quality value is based on an algorithm including a first portion in which a quotient of the data tape error correction value and the data tape length value is raised to an exponent equal to the scaling factor.

19. The system of claim 18, wherein the algorithm further includes a degradation coefficient, wherein generating the data tape read quality value includes multiplying the first portion by the degradation coefficient.

20. The system of claim 15, wherein the operations further comprise:

obtaining historical data tape data for a plurality of data tapes;

generating a training data set comprising:
a plurality of data points associated with a plurality of sets of data tape attributes, and
for each data point of the plurality of data points, a respective historical scaling factor value; and training the machine learning model based on the training data set to recommend a particular scaling factor value for a particular set of data tape attributes.

* * * * *

UNITED STATES PATENT AND TRADEMARK OFFICE
CERTIFICATE OF CORRECTION

PATENT NO. : 11,935,570 B2
APPLICATION NO. : 17/826017
DATED : March 19, 2024
INVENTOR(S) : Wyman et al.

Page 1 of 1

It is certified that error appears in the above-identified patent and that said Letters Patent is hereby corrected as shown below:

In the Specification

In Column 1, Line 7, delete "Applications" and insert -- Applications: --, therefor.

In Column 14, Line 26, delete "a" and insert -- $\alpha$ --, therefor.

Signed and Sealed this
Twenty-third Day of July, 2024

Katherine Kelly Vidal
*Director of the United States Patent and Trademark Office*